UNITED STATES PATENT OFFICE 2,027,777

MORDANT DISAZO-DYESTUFFS AND THEIR MANUFACTURE

Ernst Hug, Neu-Allschwil, near Basel, and Max Müller, Basel, Switzerland, assignors to Durand & Huguenin S. A., Basel, Switzerland No Drawing. Application February 25, 1935, Serial No. 8,208. In Germany March 5, 1934

6 Claims. (Cl. 260—81)

According to this invention mordant disazo-dyestuffs which correspond to the following general formula:

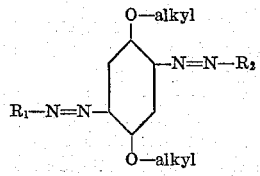

wherein $R_1$ stands for a sulphonated benzene nucleus and $R_2$ stands for a benzene nucleus containing as substituents a hydroxyl- and a carboxylic group in ortho position to each other, are produced by diazotizing a sulphonated amine of the benzene series ($NH_2$—$R_1$), combining the diazo compound thus formed in an acid medium with an amino-hydroquinone-dialkyl-ether, then diazotizing the amino-azo-compound thus formed and finally combining it with an ortho-hydroxy-carboxylic acid of the benzene series.

Aminohydroquinone-dialkyl-ethers have already been used as middle components in the manufacture of polyazo-dyestuffs. Such compounds serve for example in the process of German specification No. 109,491 for the production of basic dyestuffs, in the processes of German specifications Nos. 222,890 and 229,303 for the production of substantive dyestuffs, in the process of Germany specifications Nos. 391,091, 392,077 and 517,438 for the production of insoluble dyestuffs on the fibre and finally in British specifications Nos. 391,862, 395,005 and 395,006 for the production of dyestuffs for acetate artificial silk.

However, aminohydroquinone - dialkyl - ethers have hitherto not been used for the production of mordant dyestuffs. The dyestuffs obtainable therefrom, in accordance with the present invention, are particularly suitable for printing on cotton. When printed on cotton with a chromium mordant they yield red-brown to violet-brown shades of good fastness properties and represent a valuable enrichment in the range of chrome-dyestuffs for printing on cotton.

The following examples illustrate the invention, the parts being by weight:—

Example 1

20.75 parts of 1-amino-4-chlorobenzene-3-sulphonic acid are dissolved together with 5.5 parts of anhydrous sodium carbonate in 150 parts of water and 6.9 parts of sodium nitrite are added in form of a concentrated solution. The solution thus prepared is allowed to run gradually whilst stirring into a mixture of 45 parts of hydrochloric acid and 50 parts of ice, the temperature of the reaction mixture being maintained within the range of 0–10° C. The diazo suspension thus obtained free from excess of nitrous acid, is allowed to run into a solution previously prepared from 15.3 parts of aminohydroquinone-dimethyl-ether, 150 parts of water and sufficient hydrochloric acid to give an acid reaction towards Congo. The whole is well stirred and the temperature, which is at first 10° C., is gradually raised to 20–25° C. After stirring has been continued for about 15 hours the coupling is achieved and the red-brown amino-azo compound which has been formed has for the greater part separated in form of a sparingly soluble body. 30 parts of hydrochloric acid are added, the temperature is raised to 60° C. and, whilst well stirring, there is allowed to run in slowly a concentrated aqueous solution of sodium nitrite (6.9 parts plus a small excess). When nitrite is no longer consumed, the whole is stirred for a short time and allowed to cool.

The yellow-brown diazo compound which has separated is advantageously filtered and introduced, while being still moist, into a cooled aqueous solution of 13.8 parts of salicylic acid, 5 parts of sodium hydroxide (100 per cent. strength) and 20 parts of anhydrous sodium carbonate whilst stirring. The coupling proceeds smoothly. Stirring is continued for some hours and the reaction mixture is finally heated to 40° C. and then cooled. The disazo-dyestuff formed is precipitated by acidification with hydrochloric acid, filtered and converted into the potassium salt in the usual manner.

The new dyestuff is a brown powder which is readily soluble in hot water to an orange-brown solution from which, on cooling, the dyestuff crystallizes for the greater part. The dyestuff dissolves in concentrated sulphuric acid to a red-violet solution. When printed on cotton with a chromium mordant it yields deep red-brown shades of good fastness properties.

In this example there may be used, with similar results, instead of 1-amino-4-chlorobenzene-3-sulphonic acid the corresponding quantity of sulphanilic acid or metanilic acid, and instead of amino-hydroquinone-dimethyl-ether there may also be used amino-hydroquinone-diethyl-ether.

Example 2

21.8 parts of 1-amino-4-nitrobenzene-3-sulphonic acid are dissolved in water containing some sodium carbonate and diazotized in the usual manner. The suspension of the diazo compound is allowed to run into a solution of 15.3 parts of amino-hydroquinone-dimethyl-ether in 150 parts of water and sufficient hydrochloric acid to give the solution an acid reaction towards Congo. The reaction mass is stirred at 25° C. until coupling is finished, which is the case after about 15 hours. The amino-azo-compound formed has separated for the greater part. Then, 30 parts of hydrochloric acid are added and the amino-azo compound is diazotized by gradual addition of a solution of sodium nitrite (6.9 parts plus a small excess) at 60–70° C. whilst well stirring. The sparingly soluble diazo compound thus formed is filtered and introduced, whilst still moist, into a cooled solution of 13.8 parts of salicylic acid, 5 parts of sodium hydroxide (100 per cent strength) and 20 parts of anhydrous sodium carbonate in 250 parts of water whilst stirring. Coupling is achieved within a short time and the dyestuff formed is then worked up in a manner similar to that described in Example 1.

The potassium salt of the new dyestuff is a dark brown powder which dissolves readily in hot water to a red-brown solution and dissolves in concentrated sulphuric acid to a blue-violet solution.

In chrome printing on cotton the dyestuff yields violet-brown shades of good fastness properties.

In this example there may be used, instead of 1-amino-4-nitrobenzene-3-sulphonic acid, the isomers thereof such as 1-amino-3-nitrobenzene-4-sulphonic acid and 1-amino-2-nitrobenzene-4-sulphonic acid, and for the second coupling operation there may be used, instead of salicylic acid, a homologue thereof such as ortho-cresotinic acid or meta-cresotinic acid.

In all cases similar dyestuffs are obtained.

What we claim is:—

1. A process for the manufacture of new mordant disazo-dyestuffs which correspond to the following general formula:

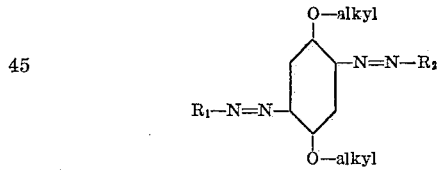

wherein $R_1$ stands for a sulphonated benzene nucleus and $R_2$ stands for a benzene nucleus containing as substituents a hydroxyl- and a carboxylic group in ortho position to each other, said process consisting in diazotizing a sulphonated amino body of the benzene series ($NH_2-R_1$), combining the diazo compound thus obtained in an acid medium with amino-hydroquinone-dialkyl-ether, further diazotizing the amino-azo compound thus formed and combining the diazo-azo compound with an ortho-hydroxy-carboxylic acid of the benzene series ($R_2$).

2. A process for the manufacture of new mordant disazo-dyestuffs which correspond to the following general formula:

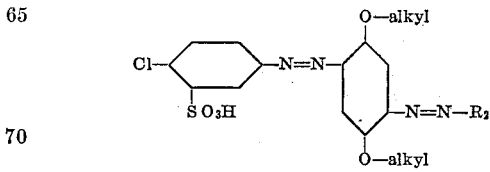

wherein $R_2$ stands for a benzene nucleus containing as substituents a hydroxyl- and a carboxylic group in ortho position to each other, said process consisting in diazotizing 1-amino-4-chlorobenzene-3-sulphonic acid, combining the diazo compound thus obtained in an acid medium with amino-hydroquinone-dialkyl-ether, further diazotizing the amino-azo body thus formed and combining the diazo-azo compound with an ortho hydroxy-carboxylic acid of the benzene series ($R_2$).

3. A process for the manufacture of new mordant disazo-dyestuffs which correspond to the following general formula:

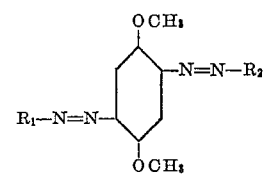

wherein $R_1$ stands for a sulphonated benzene nucleus and $R_2$ stands for a benzene nucleus containing as substituents a hydroxyl- and a carboxylic group in ortho position to each other, said process consisting in diazotizing a sulphonated amino body of the benzene series ($NH_2-R_1$), combining the diazo compound thus obtained in an acid medium with amino-hydroquinone-dimethyl-ether, further diazotizing the amino-azo body thus formed and combining the diazo-azo compound with an ortho-hydroxy-carboxylic acid of the benzene series ($R_2$).

4. A process for the manufacture of new mordant disazo-dyestuffs which correspond to the following general formula:

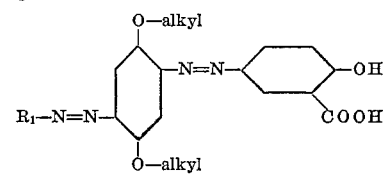

wherein $R_1$ stands for a sulphonated benzene nucleus, said process consisting in diazotizing a sulphonated amino body of the benzene series ($NH_2-R_1$), combining the diazo compound thus obtained in an acid medium with amino-hydroquinone-dialkyl-ether, further diazotizing the amino-azo body thus formed and combining the diazo-azo compound with salicylic acid.

5. A process for the manufacture of a new mordant disazo-dyestuff which corresponds to the following formula:

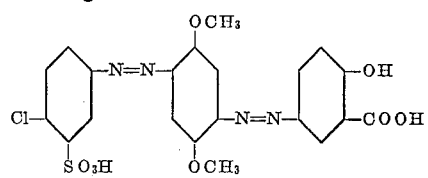

said process consisting in diazotizing 1-amino-4-chlorobenzene-3-sulphonic acid, combining the diazo compound thus obtained in an acid medium with amino-hydroquinone-dimethyl-ether, further diazotizing the amino-azo body thus formed and combining the diazo-azo compound with salicylic acid.

6. Mordant disazo-dyestuffs corresponding to the following general formula:

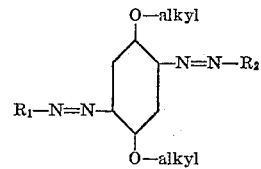

wherein $R_1$ stands for a sulphonated benzene nucleus and $R_2$ stands for a benzene nucleus containing as substituents a hydroxyl- and a carboxylic group in ortho position to each other, said dyestuffs constituting brown powders being in form of their alkali salts easily soluble in water, yielding orange-brown to red-brown solutions giving with concentrated sulphuric acid red-violet to blue-violet colorations, and yielding in chrome printing on cotton red-brown to violet-brown of good fastness properties.

ERNST HUG.
MAX MÜLLER.